Aug. 9, 1932.                C. KARL                1,871,323
              DETACHMENT MECHANISM FOR CUTTER BARS
                      Filed Oct. 28, 1929
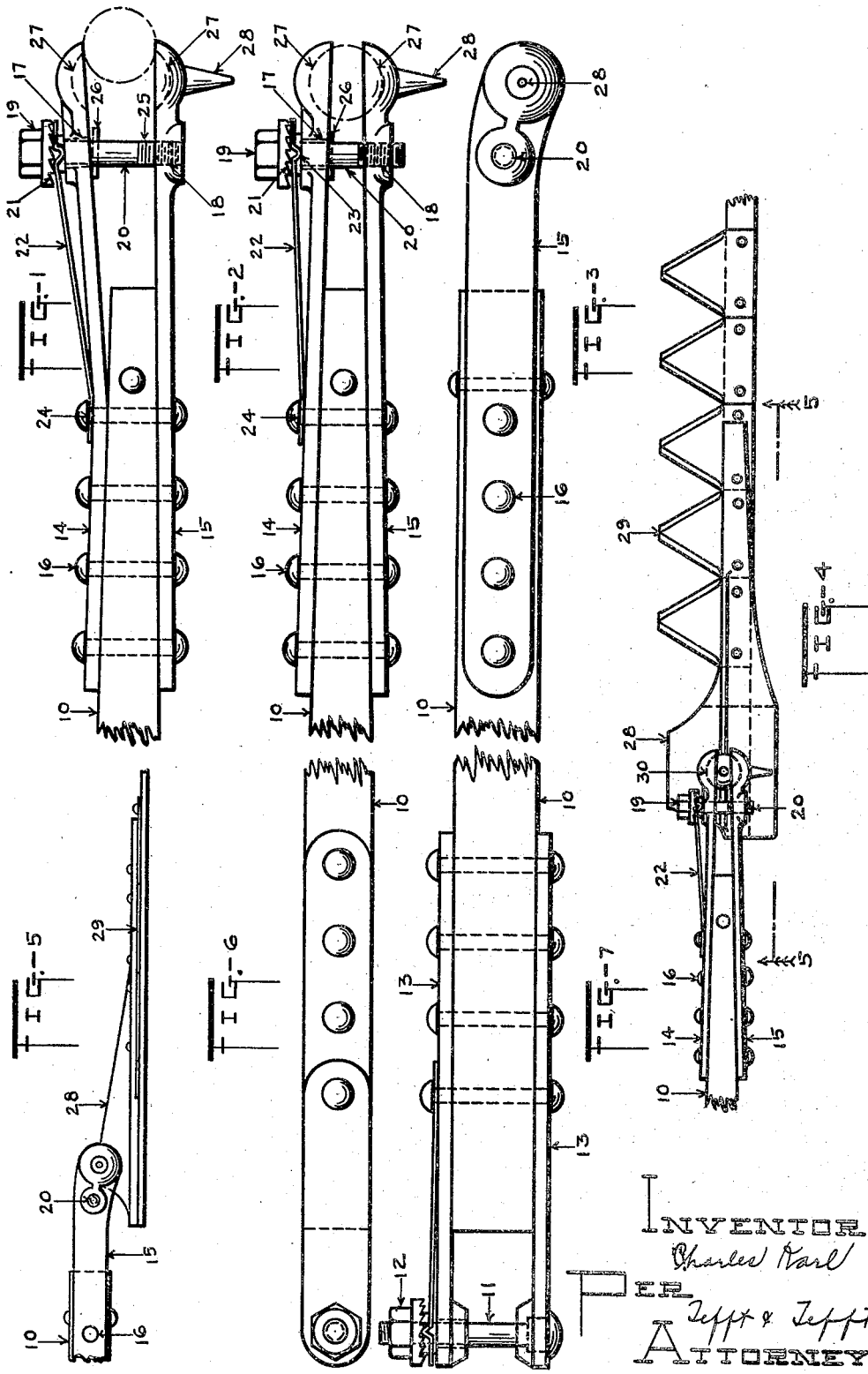
INVENTOR
Charles Karl
PER
Tefft & Tefft
ATTORNEYS Patented Aug. 9, 1932

1,871,323

UNITED STATES PATENT OFFICE

CHARLES KARL, OF PEORIA, ILLINOIS

DETACHMENT MECHANISM FOR CUTTER BARS

Application filed October 28, 1929. Serial No. 402,906.

This invention relates to detachment mechanism for cutter bars.

One of the objects of the invention is in the provision of mechanism which permits the ready detachment or attachment of the conventional cutter bars with the pitmen which in turn are connected to mowing machines.

Another object lies in the provision of a simple mechanism capable of production at a minimum cost, said mechanism permitting the ready detachment as well as attachment of the conventional cutter bars to the pitmen of mowing machines.

Still another object lies in the connecting mechanism between mowing machine pitmen and cutter bars, said connection being of such type as to permit either the attachment or detachment of the cutter bars by the mere manual screwing or unscrewing of a bolt member.

A further object lies in the provision of mechanism permitting the detachment of cutter bars from pitmen of mowing machines, said mechanism including a specially fashioned threaded bolt member adapted when manually moved in one direction to release the cutter bar, and when turned in the opposite direction to clamp the cutter bar to the pitman.

Other objects will appear in the following specification, taken in connection with the annexed drawing, in which—

Fig. 1 is a plan view of my device showing the threaded attachment bolt holding the pitman straps in an expanded position;

Fig. 2 is a similar plan view with the threaded bolt holding the pitman straps in a clamped position;

Fig. 3 is a side elevational view;

Fig. 4 is a plan view, showing the manner of assembly of the cutter bar with the pitman;

Fig. 5 is an elevational view taken on the line 5—5 and in the direction of the arrows shown in Fig. 4;

Fig. 6 is an elevational view showing the manner of connecting the pitman to the mowing machine; and Fig. 7 is a plan view of Fig. 6.

The manufacturer of such connecting means contemplates production of such devices not only in great volume but of necessity at an extremely low cost.

Inasmuch as the farmer, the ultimate user of such devices, is confronted with the necessity of continually detaching the cutter bar from the pitman in order either to sharpen the knives or to repair same, this manual act of detachment or attachment of the cutter bar becomes of considerable importance not only from the standpoint of time but also because of the mechanical difficulties that arise in connection therewith.

As stated before, mechanism which permitted detachment of the cutter bar with the pitman is well known. However, such mechanism required on the part of the farmer not only the necessity of removing a bolt member to permit release of the cutter bar but also an additional tool as well as operation to spread the pitman straps in order to permit complete withdrawal of the cutter bar.

In order to overcome the disadvantages attending such structure, although otherwise satisfactory from a mechanical standpoint, the present applicant has devised the mechanism now to be described which accomplishes by a simple unscrewing or screwing up of a threaded bolt member, either the automatic detachment of the cutter bar or the assembly thereof with the pitman, which in turn is connected to the mowing machine.

It might be further stated, before referring specifically to the drawings, that inasmuch as the present application is directed particularly to this attachment mechanism, no showing has been made of either the mowing machine, which is obviously conventional in design, or of the driving and supporting means for the pitmen and cutter bars.

Referring now to the drawing, there is shown therein the conventional pitman 10 capable of attachment by means of a conventional bolt 11, nut 12 and pitman strap 13, to a mowing machine, not shown. At the opposed end of the pitman 10 is shown applicant's mechanism, which as heretofore explained accomplishes a most satisfactory release of the cutter bar or attachment thereof to the pitman.

This mechanism comprises the pitman straps 14 and 15 which are either riveted or bolted, as the case may be, to the pitman, such connection being designated 16 in the drawing. These pitman straps generally assume a conventional shape, with the exception that the strap 14 is apertured as at 17 to receive a bolt member, later to be described, while the strap 15 is threaded as at 18 to receive the threaded end of said bolt member now to be described.

A specially fashioned bolt or screw, made up of the following parts, is adapted to accomplish either an expansion of the pitman straps, or a contraction thereof, by a simple manual operation which rotates the bolt either in one direction or the other. This specially fashioned screw or bolt member has a head portion 19 either integrally formed with or fixedly secured to the body portion 20 of said member. The head of the bolt obviously is so fashioned as to receive a manually operated wrench or tool which would permit rotation of same in one direction or the other. The head portion is also ratcheted as at 21 in conventional manner, to cooperate with the ordinary pitman spring 22 indented as at 23 in a manner to cooperate with the before mentioned ratchets, said pitman spring being secured as at 24 to the pitman strap 14. The body portion of the specially formed bolt or screw is not threaded throughout that portion of its length which lies immediately adjacent the head portion or nut 19, while it is threaded as at 25 for a substantial distance at its opposite end which is adapted to be received in the threaded portion 18 of the pitman strap 15. It will be noted that the bolt fits loosely in the aperture 17, as shown in Figs. 1 and 2, so as to permit tilting of the bolt when the angle between the pitman straps is changed.

Although the specially fashioned bolt is adapted to be rotated, nevertheless the position of the head or nut 19 with respect to the pitman strap 14 is never permitted to change for the reason that a lug or pin member 26, either integrally formed with or fixedly secured thereto, is so arranged upon the body of the bolt as to hold the head in the before stated non-changing position with respect to the strap 14. In other words, the bolt and integrally fashioned head may be rotated in either direction in a manner to change the threaded position of the bolt with respect to this pitman strap 15 but nevertheless any movement between the head and strap is prevented with the result that the necessity of movement of some part, due to this screwing or unscrewing operation is transmitted to the pitman strap 15.

It is apparent from the above description that applicant has provided a specially formed bolt so connected with the pitman straps 14 and 15 as to accomplish by the manual rotation of the bolt or screw either an expansion or contraction of the straps 14 and 15. As previously explained, in order to accomplish this expansion of the straps, not only was the release of a bolt member necessary but further some additional manual operation. In the present structure it is apparent that the operator by rotation of the bolt head 19 either in one direction or the other may expand or contract the pitman strap as desired.

The connecting ends of the straps are formed in the conventional manner with ball receiving sockets 27, and the usual horn 28 is also formed upon one of the pitman straps. The cutter bar is constructed in the usual manner with the frame portion 28, plural knife portion 29 and the ball joint connecting member 30.

Having described in detail the construction of my cutter bar attachment mechanism, we now turn to the operation thereof. As heretofore stated, there has been no showing of the mowing machine and driving mechanism for the cutter bars, because of their conventionality. The present structure is directed entirely to the manner of attaching or detaching the cutter bar from the pitman. Applicant accomplishes such operation by the use of a specially formed bolt or screw member cooperating with pitman straps constructed in an unusual manner with the result that the operator, in order to release the cutter bar from the pitman has merely to place a wrench or tool upon the head 19 rotate same in a direction to expand the pitman strap 14, this expansion being accomplished because of the position of the lug members 26 with respect to the strap 14 and the novel threading of the bolt with the strap 15.

When the operator has expanded the strap 14 to such a point that the ball connection is released from the sockets 27 in the pitmen, he has then merely to withdraw the cutter bar for repair purposes and following such repair to replace same in its former position and then rotate the specially formed screw in a manner to clamp the sockets 27 firmly about the ball 30 on the cutter bar.

It will also be noted that because of the particular bolt construction and assembly thereof with respect to the pitman straps, when the straps have been expanded to permit release of the cutter bar, same will remain in this position without collapse until the operator has again inserted the repaired cutter bar and thereafter rotates the bolt.

What I claim is:

In the combination of a pitman and a cutter bar, means for detachably connecting the pitman and cutter bar, said means including pitman straps of flexible material secured to the pitman and extending from one end thereof in substantially parallel relation, means on said cutter bar adapted to be received and clamped between the ends of said pitman straps, and means for positively expanding or contracting the straps to connect or disconnect the cutter bar, said means comprising a threaded bolt having one end extending loosely through one of said straps and having means on said bolt end on each side of said strap to prevent longitudinal movement of said bolt through said strap, and adapted to be threadedly connected to the second strap.

In testimony whereof I have hereunto affixed my signature.

CHARLES KARL.